United States Patent

[11] 3,628,672

[72] Inventor Gerald O. Heinz
 Streator, Ill.
[21] Appl. No. 638
[22] Filed Jan. 5, 1970
[45] Patented Dec. 21, 1971
[73] Assignee Streator Dependable Mfg. Co.
 Streator, Ill.

[54] CAPTIVE PALLET FOR LOAD-STACKING RACKS
 1 Claim, 6 Drawing Figs.
[52] U.S. Cl. .................................................. 211/153
[51] Int. Cl. ........................................... A47b 96/02,
 A47f 5/00
[50] Field of Search .......................................... 211/134,
 135, 126, 153, 148; 34/238, 237; 108/109, 107

[56] References Cited
UNITED STATES PATENTS
600,879 3/1898 Louden ......................... 211/153
1,272,207 7/1918 Bullen ........................... 108/59
1,527,789 2/1925 Doughty ....................... 34/238
2,078,681 4/1937 Otte .............................. 211/134 X
2,963,169 12/1960 Konstant ....................... 211/134
3,323,656 6/1967 Weiss et al. ................... 211/153

*Primary Examiner*—Ramon S. Britts
*Attorney*—Oltsch & Knoblock

ABSTRACT: A captive pallet is adapted to serve as a removable shelf in a storage rack and to support loads thereon in said rack and during transport between selected stations in a limited area. The pallet has a flat metal bottom plate with opposite upturned flanges and a corrugated metal plate welded to the bottom plate with its corrugations extending perpendicularly between said upturned flanges and with end flanges welded to said bottom plate.

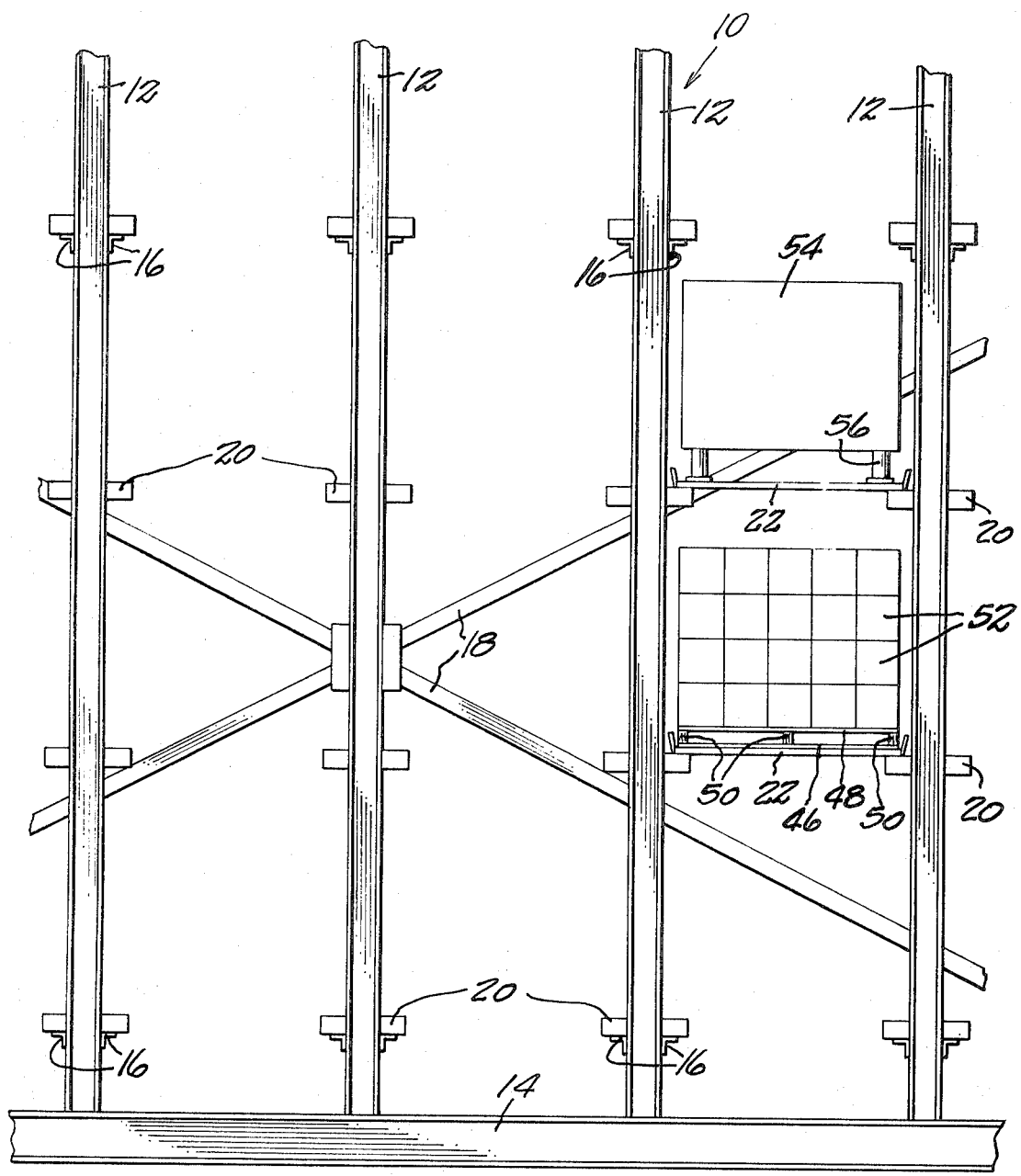

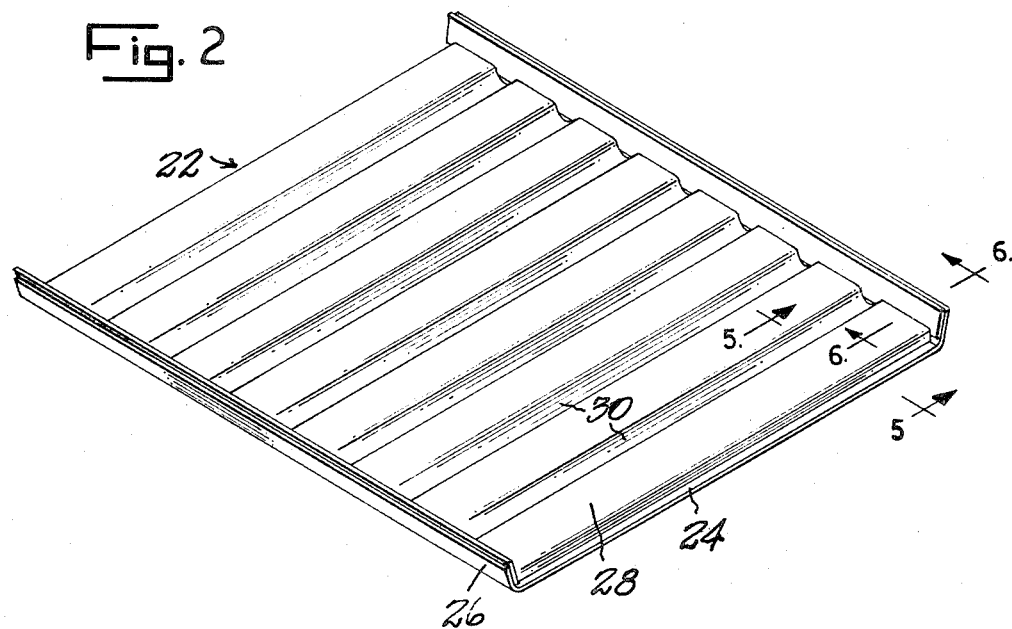
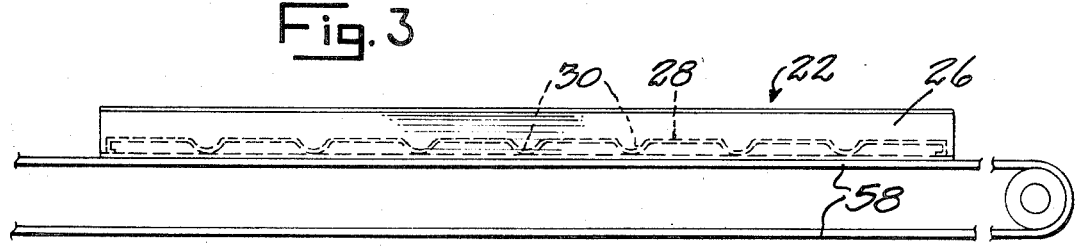
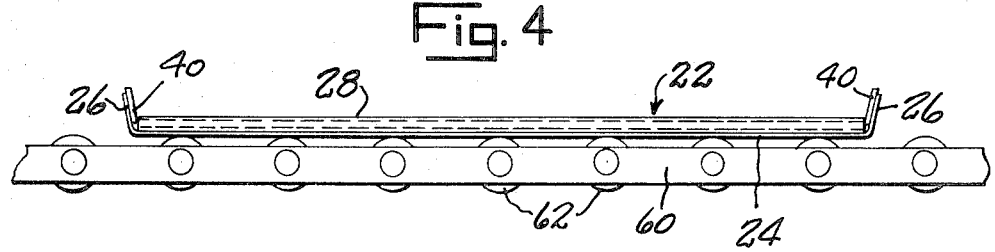
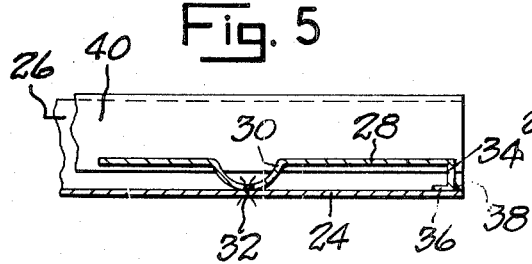
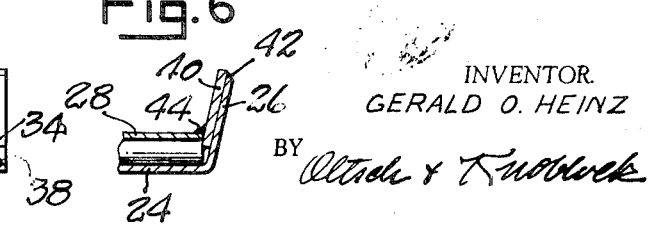

CAPTIVE PALLET FOR LOAD-STACKING RACKS

CAPTIVE PALLET FOR LOAD STACKING RACKS

This invention relates to a captive pallet for load stacking racks.

Load stacking rack systems are designed to accommodate the storage of articles of a wide variety and range of sizes, shapes and constructions. Thus, such racks may be provided to store compactly for convenient access and in any selected arrangement within the rack, items of widely divergent nature, such as nuts and bolts, forgings, castings subassemblies of widely differing types, and fabricated items, assemblies and machines ranging in size from small hand tools or electrical assemblies to large items of furniture.

Stacker rack systems are designed to utilize captive pallets which serve ash shelves to support loads thereon and are removable from the rack with the load, but are retained within a given plant or building. Thus these captive pallets are moved between the rack and various stations in a building and then returned. The captive pallet and its supported items are moved between the rack and conveyor means by stacker cranes and are transported by the conveyor to and from work receiving and delivery stations. The loads are applied to or removed from the captive pallet at selected stations by means such as forklift trucks which engage the load per se and do not engage or transport the captive pallet.

It is the primary object of this invention to provide a novel, simple, inexpensive and strong unit adapted to support objects of different types and characters thereon for storage in a rack, for movement to and from the rack by a stacker crane, and for transport to and from a work station remote from the rack by means of a conveyor to which or from which the stacker crane operates.

A further object is to provide a captive pallet which is constructed to facilitate centering thereof relative to a storage space and pallet supporting means of a rack and to facilitate centering thereon of a load applied thereto.

A further object is to provide a captive pallet which renders a rack adaptable to receive items of a wide variety of types, sizes and shapes, which is suitably reinforced to enable it to sustain heavy weights, and which has a shape and contour facilitating movement thereof by a roller or other conveyor.

Other objects will be apparent from the following specification.

IN THE DRAWINGS

FIG. 1 is a fragmentary front elevational view of a rack illustrating the use of my new captive pallet therein to support loads of different types.

FIG. 2 is a top perspective view of the captive pallet.

FIG. 3 is an edge view of the captive pallet.

FIG. 4 is a side elevational view of the captive pallet as it traverses a roller conveyor.

FIG. 5 is an enlarged fragmentary vertical sectional view taken on line 5—5 of FIG. 2.

FIG. 6 is an enlarged fragmentary sectional view taken on line 6—6 of FIG. 2.

Referring to the drawings which illustrate the preferred embodiment on the invention, the numeral 10 designates a rack wherein a plurality of elongated vertical or upright rigid structural members or columns 12 are supported upon a suitable base 14 and are interconnected with like columns by transverse structural members 16 and by longitudinal structural members 18. The columns 12 are arranged in rows aligned longitudinally to form elongated racks which are spaced apart in a warehouse or storage area to provide aisles which accommodate access to any selected part of the rack by work-handling means such as a stacker crane (not shown). At each of the columns 12 or upon transverse structural members 16 adjacent thereto are secured a plurality of vertically spaced horizontal pallet support members 20 which project into the storage space or bay defined by four adjacent columns. Four such pallet support members 20 located at the same level adjacent the four corners of the bay provide means for support for a captive pallet 22.

Each captive pallet 22 is preferably of the construction illustrated in FIGS. 2 to 6 inclusive, and includes a bottom plate portion 24 formed of sheet metal of suitable gauge. Plate 24 has a flat central portion and opposed angularly upwardly and outwardly inclined flange portions 26 which preferably extend at an angle in the range between 60° 80° from the plane of the central portion. Flanges 26 are preferably of a height in the order of 2 inches to 3 inches. The dimensions of the parts 24–26 are such that the captive pallet will fit into a bay of the rack to be supported by four support members 20 adjacent corners thereof with clearance relative to the columns 12 and relative to the pallet support members 20 next thereabove and therebelow. A typical dimension for such captive pallets is 48 inches×42½ inches, but it will be understood that this dimension is illustrative and is not intended to be limiting.

The pallet 22 includes a corrugated panel 28 formed of sheet metal of suitable gauge. Thus, panel 28, like panel 24, may be formed of 14 gauge metal, although this is cited as illustrative and is not intended to be limiting. Corrugated panel 28 is characterized by coplanar flat portions separated by corrugations 30 spaced uniformly and extending in parallel relation and projecting downwardly from panel 28 to contact and be spot welded to plate 24 at 32. In one preferred form the corrugations 30 are curved on ⅞ inches radii, are ¾ inches deep and are spaced in the order of 6 inches on centers, but such dimensions are illustrative and are not intended to be limiting. Corrugated panel 28 extends substantially the full length of the bottom plate portion 24, although it may terminate slightly spaced inwardly from the ends of plate 24 as illustrated in FIG. 5. Each end portion of panel 28 preferably includes a downwardly extending end flange 34 and an inwardly return bent flange 36 engaging plate 24. Flange 34 is preferably welded to plate 24 at 38, as seen in FIG. 5.

A flat bar 40 bears against the inner face of each flange 26 to reinforce the same, and preferably extends to or slightly above the top edge of flange 26 as seen in FIG. 6. Bar 40 is welded at 42 to the upper margin of flange 26 and is welded at its lower margin at 44 to the corrugated panel 28.

In use, each captive pallet is adapted to serve as a removable floor or shelf of a single compartment of the stacker rack, as illustrated in FIG. 1. Thus, pallet 22 may serve as a support for a conventional pallet of the type supporting a load in elevated position to accommodate lifting thereof by positioning of truck lift forks therebelow. One such type of pallet is commonly constructed of wood and entails bottom members 46 and top members 48 spaced apart and secured to spaced bars 50 at the sides and central portion thereof. Such a pallet accommodates or receives the forks of a lift truck and is adapted to support a stack of boxes 52 or other articles to be stored. The captive pallet 22 is also adapted to receive and support other articles such as barrels, drums, machine assemblies and subassemblies, and finished products of various types and shapes and sizes. Another example of an article adapted to be supported by the captive pallet is a tote box or drop bottom box 54 having supporting legs or skids 56.

The captive pallet 22 is readily shiftable from place to place within a plant, as from a storage rack to a work discharge station. FIG. 3 illustrates support and transport of a captive pallet upon a conveyor belt 58. FIG. 4 illustrates support and transport of a captive pallet 22 upon a roller conveyor of the type having a rigid frame 60 journaling parallel rollers 62 at spaced intervals. The roller conveyors may be of any desired type or construction, including units having power driven rollers, or units which are slightly inclined for gravital advance of the work thereon, or units on which a load must be advanced thereon by external means. It will be apparent that the flat bottom of plate 24 and the upwardly bent end flanges 26 accommodate traverse of the captive pallet upon a conveyor with minimum interference.

In the use of the captive pallet 22 to receive a load at a receiving station, the load will be deposited thereon in any suitable manner, as by means of a forklift truck. In cases where a load is carried by a portable pallet such as 46-48-50, the portable pallet and the load will be deposited upon the captive pallet 22. The captive pallet 22 with its load is then advanced upon a conveyor or the like to or adjacent a storage rack at which a stacker crane (not shown) lifts the captive pallet and its load from the conveyor and shifts it to the desired storage space in the rack and then inserts it in that desired space. It will be observed that the flanges 26 serve to center or guide the placement of a load upon the captive pallet 22 by reason of the vertical inclination of said flanges. The vertical inclination of the flanges 26 also serves to facilitate placement of a loaded pallet in centered position within the rack storage space.

The construction of pallet 22 is characterized by lightweight, adequate strength to carry heavy loads, minimum obstacles to usage and transport, and adequate protection for a load against injury. Also, it will be a desired plant area inasmuch as it cannot be conveniently removed or handled by usual load-carrying means, such as a forklift truck, without manual handling thereof to place the same upon truck forks and to remove it.

While the preferred embodiment of the invention has been illustrated and described, it will be understood that changes may be made within the scope of the appended claims.

What I claim is:

1. A captive pallet adapted for removable mounting within a storage rack to support loads of different types, sizes and shapes, comprising a rigid flat sheet metal member having a pair of opposed marginal flanges inclined upwardly and outwardly, a corrugated sheet metal member bearing upon and substantially spanning said first member and welded thereto, the corrugations of said last named member being of less height than said upturned flanges and extending transversely of and between said upturned flanges and extending transversely of and between said upturned flanges, and a reinforcing bar spanning the inner face of and welded to the upper margin of each upturned flange and welded to the upper marginal portion of said corrugated member.

* * * * *